United States Patent
Wu et al.

(10) Patent No.: US 9,716,378 B2
(45) Date of Patent: Jul. 25, 2017

(54) COLD SHRINKABLE TERMINATION FOR AN ELECTRIC POWER CABLE

(71) Applicants: Tyco Electronics (Shanghai) Co., Ltd., Shanghai (CN); Tyco Electronics Corporation, Berwyn, PA (US)

(72) Inventors: Jing Wu, Shanghai (CN); Wenlei Sang, Shanghai (CN); Harry George Yaworski, Cary, NC (US); Lizhang Yang, Shanghai (CN); Xiongchun Xie, Shanghai (CN)

(73) Assignees: TE Connectivity Corporation, Berwyn, PA (US); Tyco Electronics (Shanghai) Co. Ltd., Shanghai (CN)

( * ) Notice: Subject to any disclaimer, the term of this patent is extended or adjusted under 35 U.S.C. 154(b) by 8 days.

(21) Appl. No.: 14/682,216

(22) Filed: Apr. 9, 2015

(65) Prior Publication Data

US 2015/0214713 A1    Jul. 30, 2015

Related U.S. Application Data

(63) Continuation of application No. PCT/IB2013/058885, filed on Sep. 26, 2013.

(30) Foreign Application Priority Data

Oct. 9, 2012  (CN) .......................... 2012 1 0379806 7

(51) Int. Cl.
   *H01R 9/00*   (2006.01)
   *H02G 15/04*  (2006.01)
   (Continued)

(52) U.S. Cl.
   CPC ............. *H02G 15/04* (2013.01); *H01B 7/22* (2013.01); *H01B 9/02* (2013.01); *H02G 1/14* (2013.01);
   (Continued)

(58) Field of Classification Search
   CPC .............................. H01B 3/004; H02G 15/068
   (Continued)

(56) References Cited

U.S. PATENT DOCUMENTS 3,860,741 A * 1/1975 Troccoli ............... H02G 15/068
                                               174/73.1
4,470,898 A * 9/1984 Penneck ................ H01B 3/004
                                               252/511
(Continued)

FOREIGN PATENT DOCUMENTS

| EP | 1195872 A1 | 4/2002 |
|----|------------|--------|
| WO | 8403993 A1 | 10/1984 |
| WO | 9709763 A1 | 3/1997 |
| WO | 9962156 A1 | 12/1999 |

OTHER PUBLICATIONS

PCT Notification, International Search Report and Written Opinion, International Application No. PCT/IB2013/058885, dated Feb. 26, 2014, 11 pages.

*Primary Examiner* — William H Mayo, III
(74) *Attorney, Agent, or Firm* — Barley Snyder (57) ABSTRACT

A cold shrinkable termination has an electric power cable, an insulation body, and a stress control tube. The electric power cable has a conductor core, an insulation layer covering the conductor core, and a conductive shielding layer covering the insulation layer. The insulation body has a first end portion and an opposite second end portion. The stress control tube is disposed in the insulation body adjacent to the second end portion of the insulation body. The stress control tube has a first tube portion directly overlapped on the insulation layer of the electric power cable, and a second tube portion directly overlapped on the conductive shielding layer of the electric power cable and extending a predetermined length thereon when the cold shrinkable termination is mounted on the electric power cable.

23 Claims, 7 Drawing Sheets

(51) Int. Cl.
*H02G 15/068* (2006.01)
*H01B 7/22* (2006.01)
*H01B 9/02* (2006.01)
*H02G 1/14* (2006.01)
*H02G 15/18* (2006.01)

(52) U.S. Cl.
CPC ......... *H02G 15/046* (2013.01); *H02G 15/068* (2013.01); *H02G 15/1833* (2013.01); *Y10T 29/49178* (2015.01)

(58) Field of Classification Search
USPC ............ 174/73 R, 74 R, 73 SC, 75 D, 84 R, 174/110 R, 110 SC
See application file for complete search history.

(56) References Cited

U.S. PATENT DOCUMENTS

| | | | |
|---|---|---|---|
| 4,551,915 A * | 11/1985 | Larsson | H02G 15/068 174/73.1 |
| 5,280,136 A | 1/1994 | Yaworski et al. | |
| 6,015,629 A * | 1/2000 | Heyer | C08L 71/03 174/102 SC |
| 6,340,794 B1 | 1/2002 | Wandmacher et al. | |
| 8,119,193 B2 * | 2/2012 | Vallauri | H02G 15/1826 29/235 |
| 2004/0258863 A1 | 12/2004 | Kobayashi et al. | |
| 2008/0045648 A1 * | 2/2008 | Bayon | C08L 83/04 524/588 |
| 2010/0193235 A1 | 8/2010 | Taylor et al. | |
| 2011/0140052 A1 * | 6/2011 | Somasiri | H01B 3/004 252/511 |

* cited by examiner

COLD SHRINKABLE TERMINATION FOR AN ELECTRIC POWER CABLE

CROSS-REFERENCE TO RELATED APPLICATIONS

This application is a continuation of PCT International Application No. PCT/IB2013/058885 filed on Sep. 26, 2013, which claims priority under 35 U.S.C. §119 to Chinese Patent Application No. 201210379806.7 filed on Oct. 9, 2012.

FIELD OF THE INVENTION

The invention is generally relate to a cold shrinkable cable termination, and, more specifically, to a pre-expanded cold shrinkable electrical power cable termination.

BACKGROUND

Figure 1:
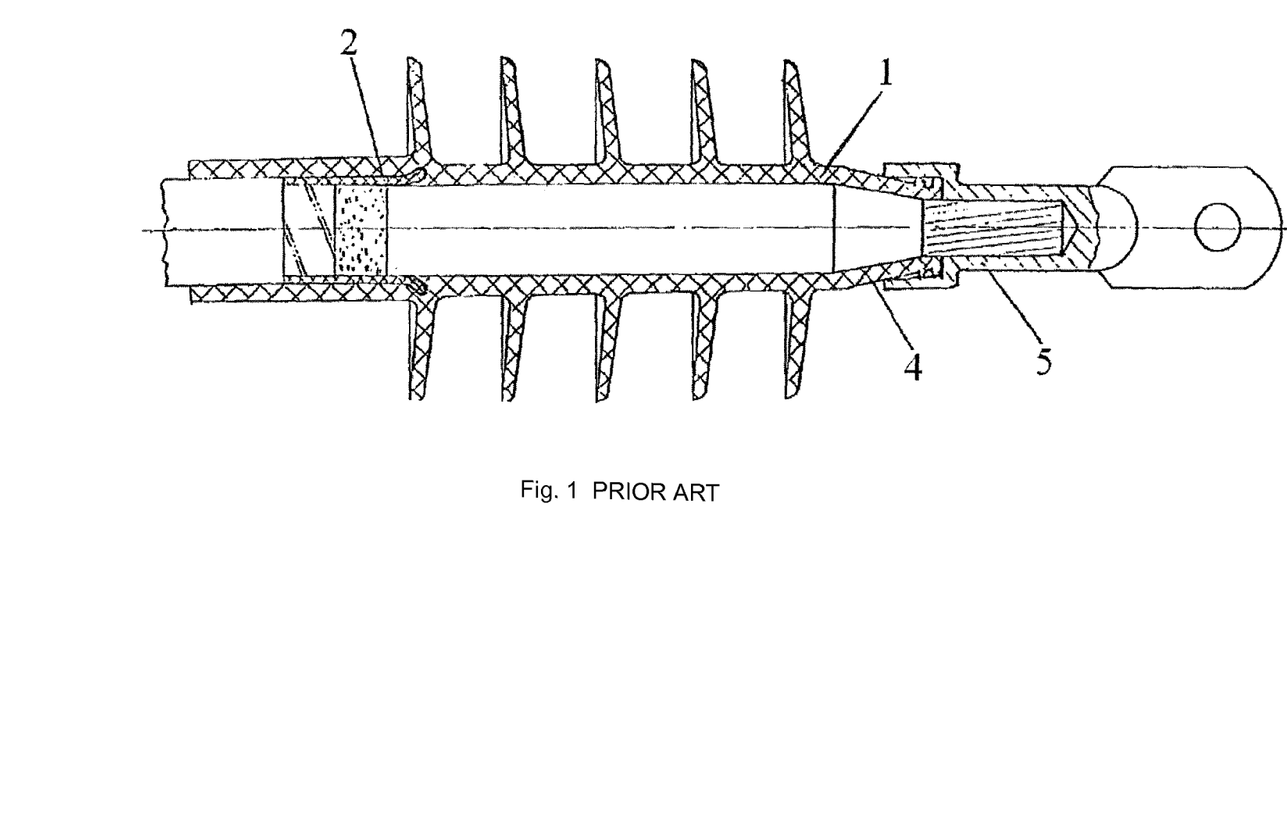
FIG. 1 is a cross-sectional view of a conventional pre-expanded cold shrink termination.

FIG. 1 shows a conventional, pre-expanded cold shrinkable termination to be mounted on a high voltage electric power cable. The conventional cold shrinkable termination has an insulation body 1 having a terminating end and an opposite cable receiving end, a stress control tube 2, and a terminating end connection member 5. The terminating end connection member 5 is sealed on the terminating end of the insulation body 1 and electrically connected to a conductor core of the electric power cable. The stress control tube 2 is positioned on an inner wall of the insulation body 1 on the cable receiving end of the insulation body 1.

The electric power cable has a conductor core, an insulation layer covering the conductor core, a conductive shielding layer covering the insulation layer, and an outer sheath covering the conductive shielding layer. In order to terminate the electric power cable to other electric elements, a length of sheath must be firstly removed to expose a length of conductive shielding layer. A section of the exposed conductive shielding layer is then removed to expose a length of insulation layer. Lastly, a section of the exposed insulation layer is removed to expose a length of conductor core.

After a section of conductive shielding layer is removed from the electric power cable, it causes an electric field concentration on a region of the electric power cable on which the conductive shielding layer has been removed. Conventionally, as shown in FIG. 1, in order to decrease the electric field concentration on the region of the electric power cable, a stress control tube 2 is provided to cover the region of the electric power cable.

However, the stress control tube 2 only extends on the region of the electric power cable on which the conductive shielding layer has been removed, and does not extend onto and cover a part of the conductive shielding layer of the electric power cable that is not removed. Accordingly, as shown in FIG. 1, when the cold shrinkable termination is mounted on the electric power cable, if an end surface (left end surface shown in FIG. 1) of the stress control tube 2 is not abutted against an end surface (right end surface shown in FIG. 1) of the conductive shielding layer of the electric power cable that is not removed, there is a gap between the two end surfaces and a local electric field concentration occurs at the gap. Thereby, the conventional cold shrinkable termination is required to be mounted with high precision on the electric power cable. The need for the high level of precision makes it extremely difficult for an operator to accurately mount the cold shrinkable termination on the electric power cable.

Furthermore, as shown in FIG. 1, in order to seal the right end of the cold shrinkable termination (the right end of the clod shrinkable termination is upward in use, and is also referred as a top end), the terminating end connection member 5 is hermetically crimped on the right end of the cold shrinkable termination to prevent water or moisture from entering into the cold shrinkable termination.

European patent application No. EP0944944B1 also discloses a conventional cold shrinkable termination having a plurality of insulation material layers overlapped with each other and a stress control compound material lined within the cold shrink termination. The stress control compound material has a conformable dielectric constant to uniformly distribute the electric field. However, the stress control compound material generates a great amount of heat and causes a local high temperature in use; thus accelerating the aging of the stress control compound material and shortening the service life of the cold shrink termination.

SUMMARY

The present invention has been made to overcome or alleviate at least one aspect of the above mentioned disadvantages.

A cold shrinkable termination has an electric power cable, an insulation body, and a stress control tube. The electric power cable has a conductor core, an insulation layer covering the conductor core, and a conductive shielding layer covering the insulation layer. The insulation body has a first end portion and an opposite second end portion. The stress control tube is disposed in the insulation body adjacent to the second end portion of the insulation body. The stress control tube has a first tube portion directly overlapped on the insulation layer of the electric power cable, and a second tube portion directly overlapped on the conductive shielding layer of the electric power cable and extending a predetermined length thereon when the cold shrinkable termination is mounted on the electric power cable.

BRIEF DESCRIPTION OF THE DRAWINGS

The invention will now be described by way of example, with reference to the accompanying Figures, of which.

DETAILED DESCRIPTION OF THE EMBODIMENT(S)

Exemplary embodiments will be described hereinafter in detail with reference to the attached Figures, wherein the like reference numerals refer to the like elements. The disclosure may, however, be embodied in many different forms and should not be construed as being limited to the embodiment set forth herein. Rather, these embodiments are provided so that the disclosure will be thorough and complete, and will fully convey the concept of the disclosure to those skilled in the art.

Figure 2:
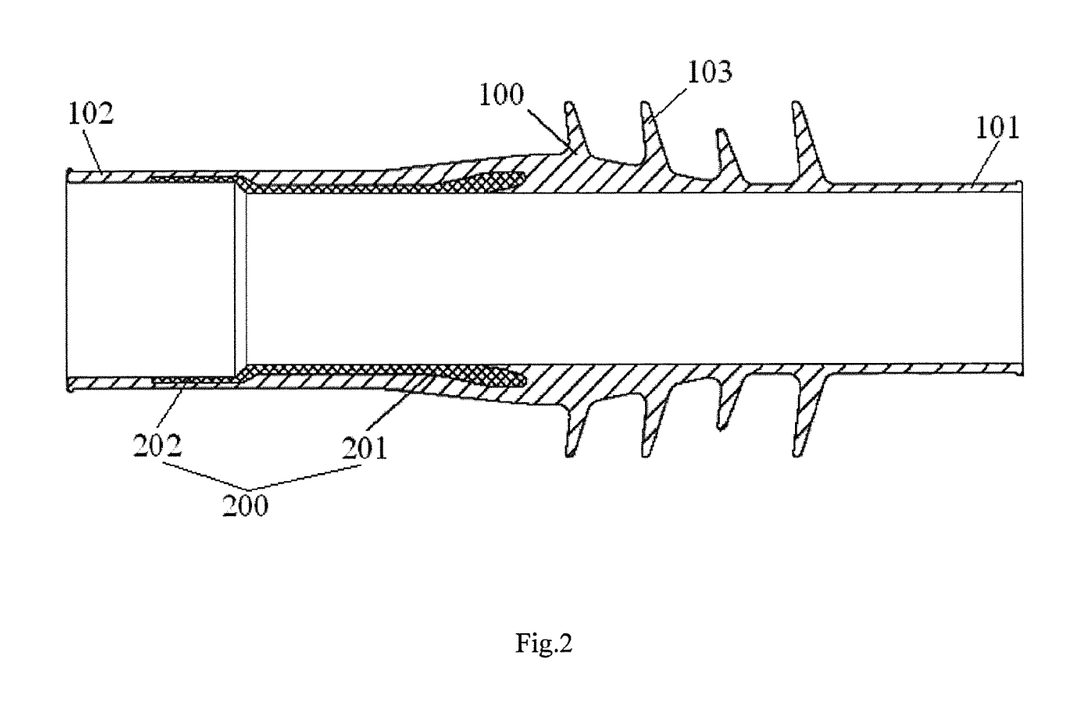
FIG. 2 is cross-sectional view of a cold shrink termination having an integrally molded insulation body and a stress control tube.

In an embodiment shown in FIG. 2, a cold shrinkable termination for an electric power cable 500 (see FIG. 5) has an integrally molded insulation body 100 and a stress control tube 200. Therefore the insulation body 100 and the stress control tube 200 are molded as a single piece.

In an embodiment, the insulation body 100 is made of an insulation silicon rubber having a resistivity of 1010 ohm cm to 1018 ohm cm. The stress control tube 200 is made of a semi-conductive silicon rubber having a resistivity of 2 ohm cm to 5000 ohm cm.

The insulation body 100 has a first end portion 101 and a second end portion 102 opposite to the first end portion 101. In a normal use, the insulation body 100 is in a vertical state, therefore, the first end portion 101 is a top end and the second end portion 102 is a bottom end.

Referring again to FIG. 2, the stress control tube 200 is positioned in the insulation body 100 adjacent to the second end portion 102 of the insulation body 100.

Since the insulation body 100 and the stress control tube 200 are integrally molded into one piece, there are no air pockets and air bubbles in an interface between the insulation body 100 and the stress control tube 200. Consequently, the insulation body 100 and the stress control tube 200 are solidly connected without any gap therebetween. In this way, the integrally molded insulation body 100 and stress control tube 200 can effectively prevent an electric field concentration formed by air pockets and air bubbles along the interface.

A process of manufacturing the molded cold shrink termination of FIG. 2 will now be described.

Firstly, a separate stress control tube 200 is molded with a semi-conductive material, for example, a semi-conductive silicon rubber. Then, the stress control tube 200 is placed in a mold and an insulation material is injected into the mold to form an insulation body 100. In this way, the stress control tube 200 and the insulation body 100 are formed into one piece ("integrally molded piece 100,200").

Figure 3:
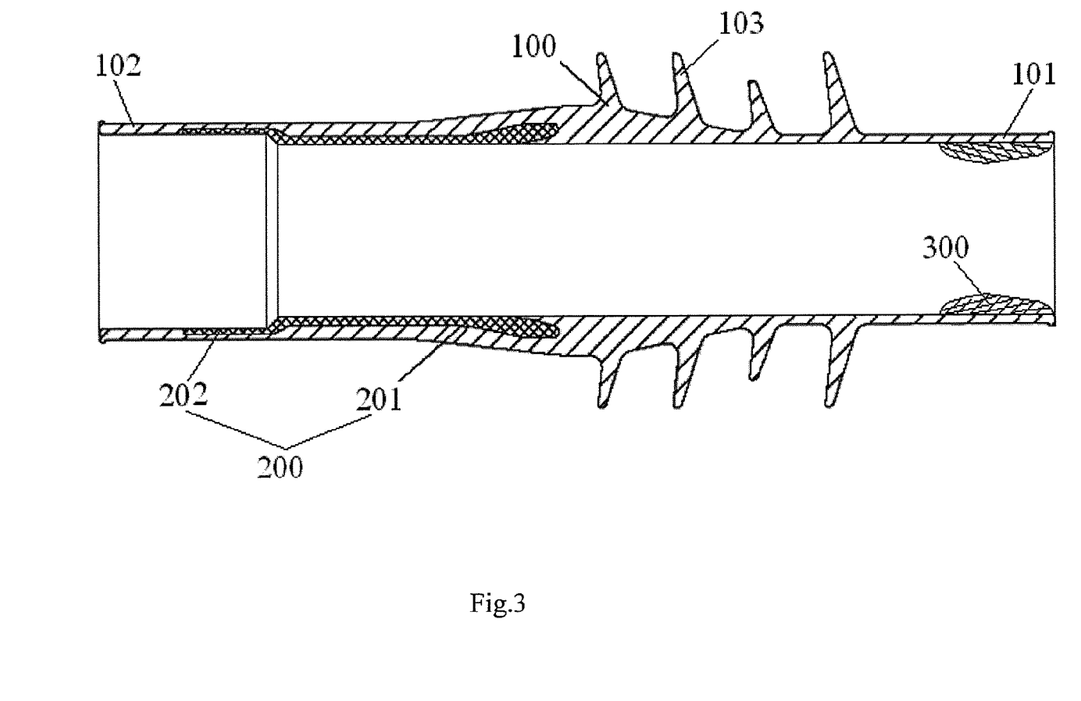
FIG. 3 is a cross-sectional view of a sealing compound positioned on an end of the integrally molded insulation body and stress control tube.

In an embodiment shown in FIG. 3, a sealing compound 300 is directly disposed in an end of the molded one piece of FIG. 2, along an inner surface thereof. However, the present invention is not limited to this. In another embodiment, the sealing compound 300 may be pre-applied on an end of a pre-expansion tube 400 (see FIG. 4), and the sealing compound 300 may then be pre-pressed on the inner wall of the first end portion 101 of the insulation body 100 by the pre-expansion tube 400.

Figure 4:
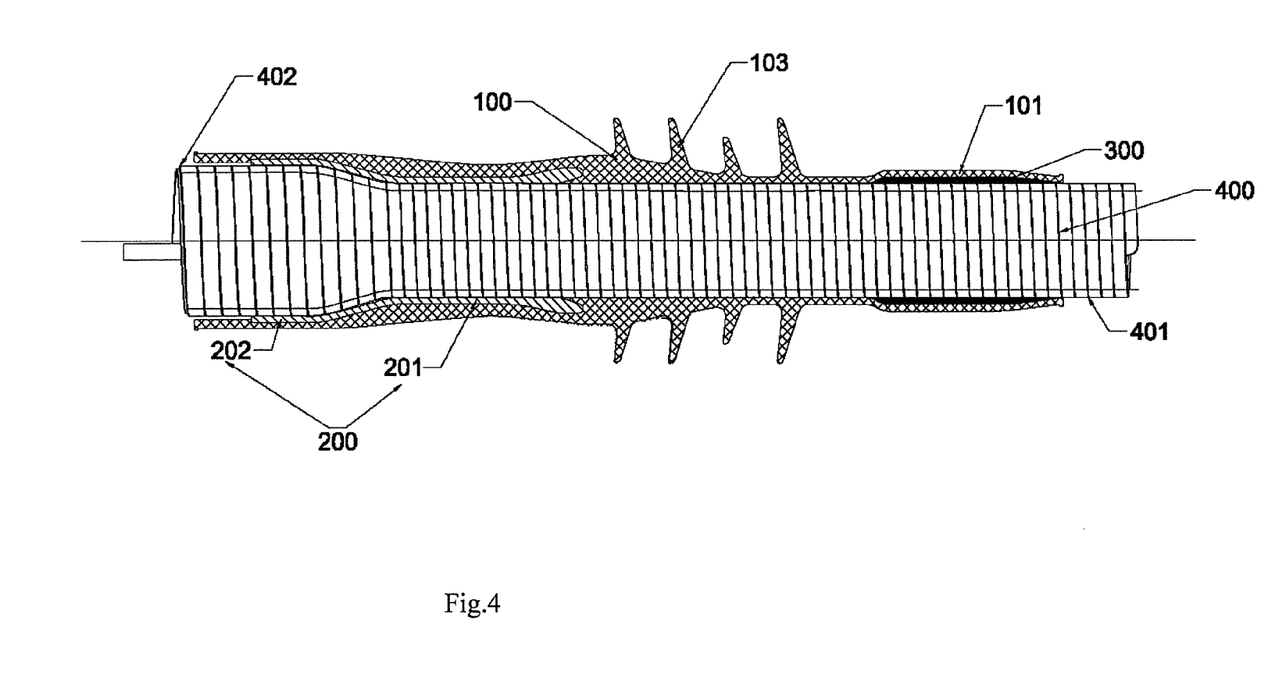
FIG. 4 is a cross-sectional view of the cold shrink termination pre-expanded on a pre-expansion tube.

In an embodiment shown in FIG. 4, the cold shrink termination is pre-expanded on a pre-expansion tube 400. The sealing compound 300 is pre-applied on an end of the pre-expansion tube 400, and the integrally molded piece 100,200 of FIG. 2 is then expanded on the pre-expansion tube 400 on which the sealing compound 300 has been placed. In this way, the sealing compound 300 is pre-applied on the inner wall of the first end portion 101 of the insulation body 100 by the pre-expansion tube 400.

Figure 5:
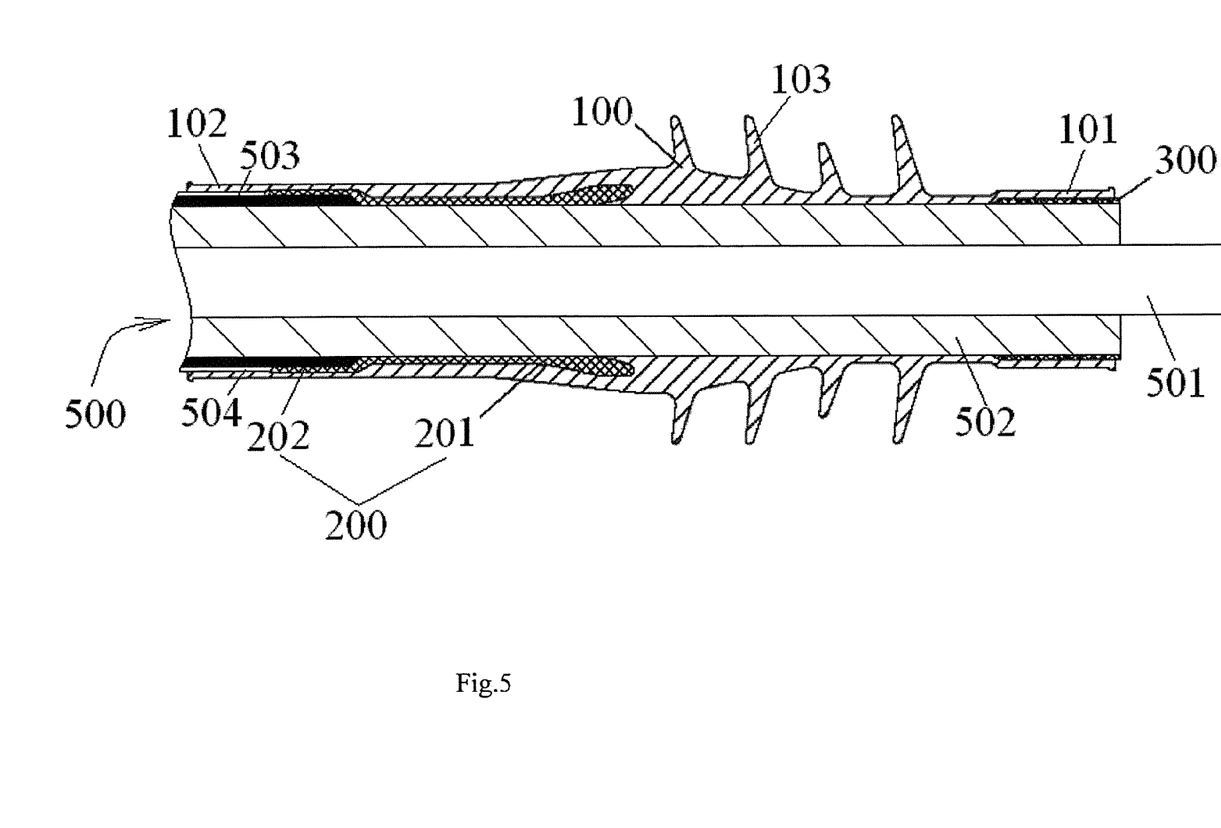
FIG. 5 is a cross-sectional view the pre-expanded cold shrink termination mounted on a prepared terminating end of an electric power cable.

In an embodiment shown in FIG. 5, the cold shrinkable termination is mounted on a processed terminating end of the electric power cable 500 by the pre-expansion tube 400 of FIG. 4. After the integrally molded piece 100,200 is expanded and supported by the pre-expansion tube 400, the processed terminating end of the electric power cable 500 is inserted into the pre-expansion tube 400. Then, the pre-expansion tube 400 is pulled out of the cold shrinkable termination. After the pre-expansion tube 400 is completely pulled out of the cold shrinkable termination, the cold shrinkable termination shown in FIG. 4 shrinks on the processed terminating end of the electric power cable 500.

In the embodiment shown in FIG. 5, the electric power cable 500 has a conductor core 501, an insulation layer 502 covering the conductor core 501, a conductive shielding layer 503 covering the insulation layer 502, and a sheath 504 covering the conductive shielding layer 503. In order to terminate the electric power cable 500 to other electric elements, a terminating end of the electric power cable 500 must be processed in advance. That is, a predetermined length of sheath 504 must be firstly removed to expose a predetermined length of conductive shielding layer 503. A section of the exposed conductive shielding layer 503 is then removed to expose a predetermined length of insulation layer 502. Lastly, a section of the exposed insulation layer 502 is then removed to expose a predetermined length of conductor core 501.

In the embodiments shown in FIGS. 3-5, the stress control tube 200 has a first tube portion 201 directly overlapped on the insulation layer 502 of the electric power cable 500 and an opposite second tube portion 202 directly overlapped on the conductive shielding layer 503 of the electric power cable 500 and extending a predetermined length thereon when the cold shrinkable termination is mounted on the electric power cable 500.

In the embodiments of FIGS. 2-5, the stress control tube 200 has an additional second tube portion 202 having a predetermined length to extend onto and cover at least a part of the conductive shielding layer 503 that is not removed. Therefore, the stress control tube 200 can extend from the insulation layer 502 to the conductive shielding layer 503. In this way, the cut end surface of the conductive shielding layer 503 is always covered by the lengthened stress control tube 200, and can effectively prevent the electric field concentration at the cut end surface of the conductive shielding layer 503. In other words, the stress control tube 200 allows a certain tolerance for the mounting position of the cold shrinkable termination on the electric power cable 500. Accordingly, the mounting operation of the cold shrinkable termination is simplified and the safety of the cold shrinkable termination is improved during use.

In an embodiment, due to the inherent flexibility and strength of the silicon rubber for producing the stress control tube 200, the second tube portion 202 has an inner diameter larger than that of the first tube portion 201. However, the invention is not limited to this; and in other embodiments, the second tube portion 202 may have an inner diameter substantially equal to that of the first tube portion 201, if the silicon rubber has a good flexibility and strength.

In an embodiment, the second tube portion 202 of the stress control tube 200 may have a length larger than 2 mm and less than 200 mm. In an embodiment, a total length of the first and second tube portions 201, 202 of the stress control tube 200 may be larger than or equal to 30 mm.

In the embodiments shown in FIGS. 4 and 5, after the pre-expansion tube 400 is completely pulled out of the cold shrinkable termination, the sealing compound 300 pressed on the inner wall of the first end portion 101 of the insulation body 100 shrinks on the insulation layer 502 of the electric power cable 500 together with the insulation body 100. As a result, the first end portion 101 of the cold shrinkable termination is sealed on the insulation layer 502 of the electric power cable 500, preventing water or moisture from entering into the cold shrink termination.

Further referring to FIGS. 4 and 5, after the pre-expansion tube 400 is completely pulled out of the cold shrinkable termination, the second end portion 102 of the insulation body 100 shrinks on the sheath 504 of the electric power cable 500. As a result, the second end portion 102 of the insulation body 100 is sealed on the sheath 504 of the electric power cable 500, preventing water or moisture from entering into the cold shrink termination.

As shown in FIG. 5, after the cold shrinkable termination is mounted on the electric power cable 500, the exposed conductor core 501 of the electric power cable 500 extends out of the cold shrinkable termination and is electrically connected to another electric power cable or a connector (not shown).

The conductive shielding layer 503 may be a metal conductive shielding layer, such as a copper wire conductive shielding layer, a copper tape conductive shielding layer, or an aluminum armored shield layer. The stress control tube 200 may be made of a semi-conductive silicon rubber, and the insulation body 100 may be made of an insulation silicon rubber. In this way, the stress control tube 200 and the insulation body 100 can be molded together well to form one piece.

In the embodiments shown in FIGS. 2-5, a plurality of circumferentially extending ribbed protrusions 103 are disposed on an outer wall of the insulation body 100 so as to increase the creepage distance. The ribbed protrusions 103 extend radially outward from the outer wall of the insulation body 100.

In an embodiment, the electric power cable may be an electric power cable used to transmit a high voltage below 110 kV. In an embodiment, the electric power cable transmits a voltage of 110 kV. In another embodiment, the electric power cable transmits a voltage of 10 kV or less.

In an embodiment, the profile of the stress control tube 200 is optimized to decrease the electric field at the processed terminating end of the electric power cable 500. As a result, the electric field is distributed more uniformly at the processed terminating end of the electric power cable 500 without increasing the length of the insulation body 100 of the cold shrinkable termination.

In an embodiment shown in FIG. 4, the pre-expansion tube 400 may be a variable diameter tube including several sections having different diameters. In an embodiment, the pre-expansion tube 400 has a first expanding section 401 with a first outer diameter and a second expanding section 402 with a second outer diameter larger than the first outer diameter. The second expanding section 402 of the pre-expansion tube 400 is used to expand the second tube portion 202 of the stress control tube 200 and the second end portion 102 of the insulation body 100. The first expanding section 401 of the pre-expansion tube 400 is used to expand the other portion of the cold shrink termination except the second tube portion 202 of the stress control tube 200 and the second end portion 102 of the insulation body 100.

Although a variable diameter pre-expansion tube 400 is shown in FIG. 4, the invention is not limited to this. In other embodiments, a constant diameter pre-expansion tube may be used to expand the cold shrinkable termination.

Figure 6:
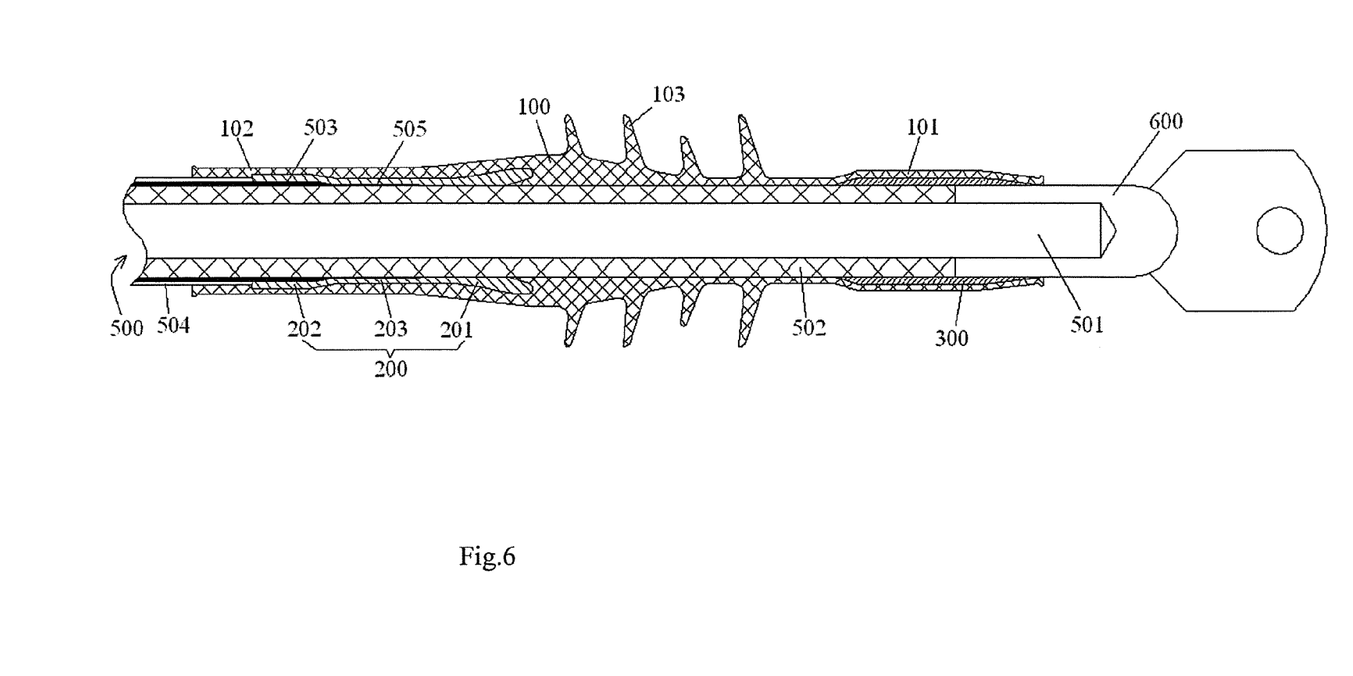
FIG. 6 is a cross-sectional view a pre-expanded cold shrink termination mounted on a prepared terminating end of an electric power cable.

In an embodiment shown in FIG. 6, a cold shrinkable termination is mounted on a processed terminating end of the electric power cable 500 by the pre-expansion tube 400 of FIG. 4. The electric power cable 500 has a semi-conductive shielding layer 505 positioned between the insulation layer 502 and the conductive shielding layer 503. During processing of the connection termination of the electric power cable 500, a predetermined length of conductive shielding layer 503 is removed to expose the semi-conductive shielding layer 505, and a predetermined length of exposed semi-conductive shielding layer 505 is removed to expose the insulation layer 502.

In addition, as shown in FIG. 6, the stress control tube 200 has the first tube portion 201, the second tube portion 202, and a third tube portion 203 between the first tube portion 201 and the second tube portion 202.

When the cold shrinkable termination is mounted on the electric power cable 500, the first tube portion 201 is directly overlapped on the insulation layer 502 of the electric power cable 500, the second tube portion 202 is directly overlapped on the conductive shielding layer 503 of the electric power cable 500 and extends a predetermined length thereon, and the third tube portion 203 is directly overlapped on the semi-conductive shielding layer 505 of the electric power cable 500.

Also shown in the embodiment of FIG. 6, the cold shrinkable termination further comprises a metal connection terminal 600. The metal connection terminal 600 has an end extending into the first end portion 101 of the cold shrinkable termination, being crimped on the exposed conductor core 501 of the electrical power cable 500. An opposite end of the metal connection terminal 600 protrudes out of the first end portion 101 of the cold shrinkable termination to be electrically connected to another electric power cable or a connector. When the cold shrinkable termination is mounted on the electric power cable 500, the sealing compound 300 seals the interface between the first end portion 101 of the insulation body 100, the insulation layer 502 of the electric power cable 500, and the interface between the first end portion 101 of the insulation body 100 and the metal connection terminal 600.

Although the insulation body 100 and the stress control tube 200 are integrally molded into one piece, the invention is not limited to this. In other embodiments, at least a part of the stress control tube 200 may be sprayed on the inner wall of the insulation body 100. For example, an insulation body 100 may be firstly molded, and then a semi-conductive silicon rubber may be sprayed on the inner wall of the insulation body 100, so that the insulation body 100 and the stress control tube 200 are formed into one piece.

Figure 7:
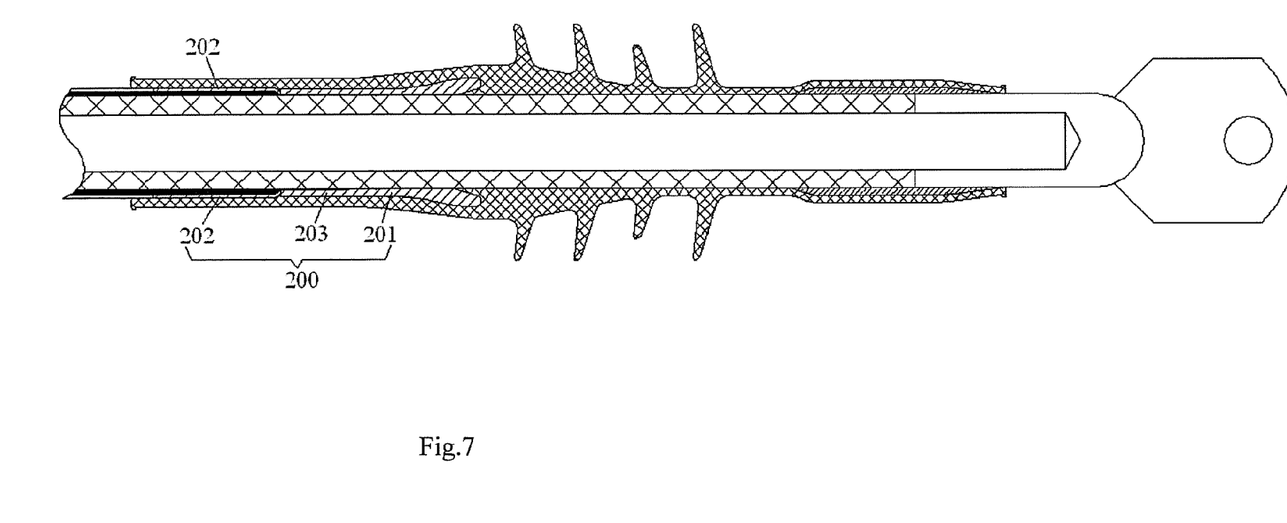
FIG. 7 is a cross-sectional view of a stress control tube sprayed on an inner wall of an insulation body.

In an embodiment shown in FIG. 7, a portion of the stress control tube 200 is sprayed on an inner wall of an insulation body 100. The second tube portion 202 of the stress control tube 200 may also be formed in the insulation body 100 by spraying, and the first and third tube portions 201, 203 of the stress control tube 200 may be molded in the insulation body 100.

Although several exemplary embodiments have been shown and described above, those of ordinary skill in the art would appreciate that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "an embodiment" are not intended to be interpreted as excluding the existence of additional embodiments that also incorporate the recited features. Moreover, unless explicitly stated to the contrary, embodiments "comprising" or "having" or "including" an element or a plurality of elements having a particular property may include additional such elements not having that property.

What is claimed is:

1. A cold shrinkable termination comprising:
   an electric power cable having
      a conductor core,
      an insulation layer covering the conductor core, and
      a conductive shielding layer covering the insulation layer;
   an insulation body having a first end portion and an opposite second end portion; and
   a stress control tube molded to and integrally formed with the insulation body adjacent to the second end portion of the insulation body, and having
      a first tube portion directly overlapped on the insulation layer of the electric power cable, and
      a second tube portion directly overlapped on the conductive shielding layer of the electric power cable and extending a predetermined length thereon when the cold shrinkable termination is mounted on the electric power cable, an end surface of the second tube portion protruding from an inner wall of the insulation body.

2. The cold shrinkable termination according to claim 1, wherein the conductive shielding layer is made of metal.

3. The cold shrinkable termination according to claim 2, wherein the conductive shielding layer is copper wire or copper tape.

4. The cold shrinkable termination according to claim 1, wherein the electric power cable further comprises a semi-conductive shielding layer positioned between the insulation layer and the conductive shielding layer.

5. The cold shrinkable termination according to claim 4, wherein the stress control tube further comprises a third tube portion positioned between the first tube portion and the second tube portion.

6. The cold shrinkable termination according to claim 5, wherein the second tube portion has an inner diameter larger than or equal to that of the first tube portion.

7. The cold shrinkable termination according to claim 6, wherein when the cold shrinkable termination is mounted on the electric power cable, the third tube portion of the stress control tube directly overlaps on the semi-conductive shielding layer of the electric power cable.

8. The cold shrinkable termination according to claim 7, wherein the electrical power cable further comprises an outermost sheath layer covering the conductive shielding layer; and the second end portion of the insulation body is sealed on the sheath.

9. The cold shrinkable termination according to claim 8, wherein the end surface of the second tube portion abuts a cut end surface of the sheath.

10. The cold shrinkable termination according to claim 1, further comprising a metal connecting terminal connected to the conductor core of the electrical power cable;
   and a sealing compound disposed on the inner wall of the first end portion of the insulation body, sealing the first end portion of the insulation body positioned on the insulation layer of the electrical power cable, and the metal connection terminal when the cold shrinkable termination is mounted on the electrical power cable.

11. The cold shrinkable termination according to claim 10, wherein the sealing compound is disposed on the inner wall of the first end portion of the insulation body by a pre-expansion tube before the cold shrinkable termination is mounted on the electric power cable.

12. The cold shrinkable termination according to claim 1, further comprising a pre-expansion tube having:
   a first expanding section having a first outer diameter, and being positioned in the stress control tube and holding the first tube portion of the stress control tube and the first end portion of the insulation body in a radially expanded state; and
   a second expanding section having a second outer diameter larger than or equal to the first outer diameter, and being positioned in the stress control tube, and holding the second tube portion of the stress control tube and the second end portion of the insulation body in a radially expanded state.

13. The cold shrinkable termination according to claim 12, wherein when the pre-expansion tube is positioned in the stress control tube, the cold shrinkable termination is held in a radially pre-expanded state prior to being mounted on the electric power cable.

14. The cold shrinkable termination according to claim 1, wherein the stress control tube is made of a semi-conductive silicon rubber.

15. The cold shrinkable termination according to claim 14, wherein the semi-conductive silicon rubber has a resistivity of 2 ohm cm to 5000 ohm cm.

16. The cold shrinkable termination according to claim 1, wherein the insulation body is made of an insulation silicon rubber.

17. The cold shrinkable termination according to claim 16, wherein the insulation silicon rubber has a resistivity of 1010 ohm cm to 1018 ohm cm.

18. The cold shrinkable termination according to claim 1, wherein a plurality of ribbed protrusions are positioned on an outer wall of the insulation body, and extend radially outward.

19. The cold shrinkable termination according to claim 1, wherein the electric power cable is used to transmit a high voltage of 110 kV or less.

20. The cold shrinkable termination according to claim 1, wherein the second tube portion of the stress control tube has a length larger than 2 mm and less than 200 mm.

21. The cold shrinkable termination according to claim 20, wherein a total length of the first and second tube portions of the stress control tube is larger than or equal to 30 mm.

22. A method of producing a cold shrinkable termination, comprising the steps of:
   providing a first portion of a stress control tube;
   placing the first portion of the stress control tube in a mold and injecting an insulation material into the mold to form an insulation body integrally formed with the first portion of the stress control tube as one piece;
   spraying a second portion of the stress control tube on an inner wall of the insulation body to form an insulation body integrally formed with the second portion of the stress control tube as one piece;
   providing a pre-expansion tube;
   placing a sealing compound on an end of a pre-expansion tube; and
   inserting the pre-expansion tube, on which the sealing compound has been placed, into the integrally formed stress control tube and insulation body to radially expand the integrally formed stress control tube and insulation body.

23. The method of producing a cold shrinkable termination of claim 22, wherein the end of the pre-expansion tube having the sealing compound is disposed on an end portion of the integrally formed stress control tube and insulation body opposite to the stress control tube.

* * * * *